United States Patent
Seong et al.

(10) Patent No.: US 12,128,895 B2
(45) Date of Patent: Oct. 29, 2024

(54) AUTONOMOUS DRIVING DEVICE

(71) Applicants: SK hynix Inc., Icheon (KR); Korea Advanced Institute of Science and Technology, Daejeon (KR)

(72) Inventors: Hyunki Seong, Busan (KR); Chanyoung Jung, Seoul (KR); Seungwook Lee, Seoul (KR); David Hyunchul Shim, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 193 days.

(21) Appl. No.: 17/937,733

(22) Filed: Oct. 3, 2022

(65) Prior Publication Data

US 2023/0150498 A1    May 18, 2023

(30) Foreign Application Priority Data

Nov. 16, 2021   (KR) .................. 10-2021-0157644

(51) Int. Cl.
*B60W 30/14*   (2006.01)
*B60W 30/18*   (2012.01)
(Continued)

(52) U.S. Cl.
CPC .... *B60W 30/143* (2013.01); *B60W 30/18159* (2020.02); *B60W 40/02* (2013.01);
(Continued)

(58) Field of Classification Search
CPC ........ B60W 30/143; B60W 30/18159; B60W 40/02; B60W 60/001; B60W 2556/40;
(Continued)

(56) References Cited

U.S. PATENT DOCUMENTS 10,169,656 B2    1/2019  Song et al.
2019/0317513 A1*  10/2019 Zhang .................. G06V 10/776
(Continued)

FOREIGN PATENT DOCUMENTS

CA    3094275 A1 *  9/2019  ............. G06N 20/00
CA    3168740    *  8/2021
(Continued)

OTHER PUBLICATIONS

E.-H. Choi, "Crash factors in intersection-related crashes: An on-scene perspective," Tech. Rep., 2010.
(Continued)

*Primary Examiner* — Muhammad Shafi (57) ABSTRACT

An autonomous driving device includes an execution network configured to determine a target speed of a driving vehicle according to state information history including a plurality of state information for road environment. The plurality of state information are generated at a plurality of times. The execution network includes a spatial attention network configured to receive the state information history and to generate feature data reflecting spatial importance based on the state information history; and a temporal attention network configured to determine the target speed of the driving vehicle by applying temporal importance to an output of the spatial attention network.

11 Claims, 7 Drawing Sheets

(51) Int. Cl.
- B60W 40/02 (2006.01)
- B60W 60/00 (2020.01)
- G06N 3/045 (2023.01)
- G06N 3/049 (2023.01)

(52) U.S. Cl.
CPC ........... B60W 60/001 (2020.02); G06N 3/045 (2023.01); G06N 3/049 (2013.01); *B60W 2556/40* (2020.02)

(58) Field of Classification Search
CPC ........... B60W 60/0015; B60W 40/105; B60W 2050/0022; B60W 2520/10; G06N 3/045; G06N 3/049; G06N 3/0442; G06N 3/09; G06N 3/084; G06N 3/08; G05D 1/0221; G05D 1/0223
USPC .......................................................... 701/93
See application file for complete search history.

(56) References Cited

U.S. PATENT DOCUMENTS

| | | |
|---|---|---|
| 2021/0078594 A1 | 3/2021 | Bansal et al. |
| 2023/0040006 A1* | 2/2023 | Weiss .............. B60W 60/00274 |

FOREIGN PATENT DOCUMENTS

| | | | |
|---|---|---|---|
| CN | 112622903 | * | 4/2021 |
| FR | 2985237 | * | 7/2013 |
| KR | 10-2020-0096096 A | | 8/2020 |

OTHER PUBLICATIONS

J. C. Hayward, "Near miss determination through use of a scale of danger," Highway Research Board, 1972.
A. Sobhani, W. Young, S. Bahrololoom, M. Sarvi, et al., "Calculating time-to-collision for analysing right turning behaviour at signalised intersections," Road & Transport Research: A Journal of Australian and New Zealand Research and Practice, 2013, vol. 22, No. 3, p. 49.
C. Urmson, J. Anhalt, D. Bagnell, C. Baker, R. Bittner, M. Clark, J. Dolan, D. Duggins, T. Galatali, C. Geyer, et al., "Autonomous driving in urban environments: Boss and the urban challenge," Journal of Field Robotics, 2008, vol. 25, No. 8, pp. 425-466.
A. Cosgun, L. Ma, J. Chiu, J. Huang, M. Demir, A. M. Anon, T. Lian, H. Tafish, and S. Al-Stouhi, "Towards full automated drive in urban environments: A demonstration in gomentum station, california," in 2017 IEEE Intelligent Vehicles Symposium (IV). IEEE, 2017, pp. 1811-1818.
R. Hult, G. R. Campos, E. Steinmetz, L. Hammarstrand, P. Falcone, and H. Wymeersch, "Coordination of cooperative autonomous vehicles: Toward safer and more efficient road transportation," IEEE Signal Processing Magazine, 2016, vol. 33, No. 6, pp. 74-84.
K. Dresner and P. Stone, "A multiagent approach to autonomous intersection management," Journal of artificial intelligence research, 2008, vol. 31, pp. 591-656.
J. Lee and B. Park, "Development and evaluation of a cooperative vehicle intersection control algorithm under the connected vehicles environment," IEEE Transactions on Intelligent Transportation Systems, 2012, vol. 13, No. 1, pp. 81-90.
L. Riegger, M. Carlander, N. Lidander, N. Murgovski, and J. Sjoberg, "Centralized mpc for autonomous intersection crossing," in 2016 IEEE 19th international conference on intelligent transportation systems (ITSC). IEEE, 2016, pp. 1372-1377.
M. Bojarski, D. Del Testa, D. Dworakowski, B. Firner, B. Flepp, P. Goyal, L. D. Jackel, M. Monfort, U. Muller, J. Zhang, et al., "End to end learning for self-driving cars," arXiv preprint arXiv:1604.07316, 2016.
Z. Yang, Y. Zhang, J. Yu, J. Cai, and J. Luo, "End-to-end multimodal multi-task vehicle control for self-driving cars with visual perceptions," in 2018 24th International Conference on Pattern Recognition (ICPR). IEEE, 2018, pp. 2289-2294.
M. Bansal, A. Krizhevsky, and A. Ogale, "Chauffeurnet: Learning to drive by imitating the best and synthesizing the worst," arXiv preprint arXiv:1812.03079, 2018.
A. Kendall, J. Hawke, D. Janz, P. Mazur, D. Reda, J.-M. Allen, V.-D. Lam, A. Bewley, and A. Shah, "Learning to drive in a day," in 2019 International Conference on Robotics and Automation (ICRA). IEEE, 2019, pp. 8248-8254.
C.-J. Hoel, K. Wolff, and L. Laine, "Automated speed and lane change decision making using deep reinforcement earning," in 2018 21st International Conference on Intelligent Transportation Systems (ITSC). IEEE, 2018, pp. 2148-2155.
F. Fuchs, Y. Song, E. Kaufmann, D. Scaramuzza, and P. Duerr, "Super-human performance in gran turismo sport using deep reinforcement learning," IEEE Robotics and Automation Letters, Jul. 2021, vol. 6, No. 3.
D. Isele, R. Rahimi, A. Cosgun, K. Subramanian, and K. Fujimura, "Navigating occluded intersections with autonomous vehicles using deep reinforcement learning," in 2018 IEEE International Conference on Robotics and Automation (ICRA). IEEE, 2018, pp. 2034-2039.
D. Isele, A. Nakhaei, and K. Fujimura, "Safe reinforcement learning on autonomous vehicles," in 2018 IEEE/RSJ International Conference on Intelligent Robots and Systems (IROS). IEEE, 2018, pp. 1-6.
T. Tram, I. Batkovic, M. Ali, and J. Sjoberg, "Learning when to drive in intersections by combining reinforcement learning and model predictive control," in 2019 IEEE Intelligent Transportation Systems Conference (ITSC). IEEE, 2019, pp. 3263-3268.
X. B. Peng, M. Andrychowicz, W. Zaremba, and P. Abbeel, "Sim-to-real transfer of robotic control with dynamics randomization," in 2018 IEEE international conference on robotics and automation (ICRA). IEEE, 2018, pp. 1-8.
T. Haarnoja, A. Zhou, K. Hartikainen, G. Tucker, S. Ha, J. Tan, V. Kumar, H. Zhu, A. Gupta, P. Abbeel, et al., "Soft actor-critic algorithms and applications," arXiv preprint arXiv:1812.05905, 2019.
A. Vaswani, N. Shazeer, N. Parmar, J. Uszkoreit, L. Jones, A. N. Gomez, L. Kaiser, and I. Polosukhin, "Attention is all you need," 31st Conference on Neural Information Processing Systems (NIPS 2017), 2017.
J. L. Ba, J. R. Kiros, and G. E. Hinton, "Layer normalization," arXiv preprint arXiv:1607.06450, 2016.
J. Schulman, N. Heess, T. Weber, and P. Abbeel, "Gradient estimation using stochastic computation graphs," arXiv preprint arXiv:1506.05254, 2015.
S. Fujimoto, H. Hoof, and D. Meger, "Addressing function approximation error in actor-critic methods," in International Conference on Machine Learning. PMLR, 2018, pp. 1587-1596.
B. T. Polyak and A. B. Juditsky, "Acceleration of stochastic approximation by averaging," SIAM journal on control and optimization, 1992, pp. 838-855, vol. 30, No. 4.
A. Dosovitskiy, G. Ros, F. Codevilla, A. Lopez, and V. Koltun, "Carla: An open urban driving simulator," 1st Conference on Robot Learning (CoRL 2017), 2017.
M. Treiber, A. Hennecke, and D. Helbing, "Congested traffic states in empirical observations and microscopic simulations," Physical review E, Aug. 2000, vol. 62, No. 2, p. 1805.
A. H. Lang, S. Vora, H. Caesar, L. Zhou, J. Yang, and O. Beijbom, "Pointpillars: Fast encoders for object detection from point clouds," in Proceedings of the IEEE Conference on Computer Vision and Pattern Recognition, 2019, pp. 12697-12705.
"Intersection Safety", https://safety.fhwa.dot.gov/intersection/, 2020. [Online; accessed Mar. 3, 2020].
Zhao, X., Wang, J., Yin, G., & Zhang, K., "Cooperative driving for connected and automated vehicles at non-signalized intersection based on model predictive control", in 2019 IEEE Intelligent Transportation Systems Conference (ITSC), Oct. 2019, pp. 2121-2126. IEEE.
Hafner, M. R., Cunningham, D., Caminiti, L., & Del Vecchio, D., "Cooperative collision avoidance at intersections: Algorithms and (56) References Cited

OTHER PUBLICATIONS experiments", IEEE Transactions on Intelligent Transportation Systems, 14(3), Sep. 2013, pp. 1162-1175.

Cheng, C., Yao, D., Zhang, Y., Li, J., & Guo, Y., "A vehicle passing model in non-signalized intersections based on non-cooperative game theory", In 2019 IEEE Intelligent Transportation Systems Conference (ITSC), Oct. 27-30, 2019, pp. 2286-2291, IEEE.

Xu, H., Gao, Y., Yu, F., & Darrell, T., "End-to-end learning of driving models from large-scale video datasets" in Proceedings of the IEEE conference on computer vision and pattern recognition, Oct. 2019, pp. 2174-2182.

Behrisch, M., Bieker, L., Erdmann, J., & Krajzewicz, D., "SUMO-simulation of urban mobility: an overview" in Proceedings of SIMUL 2011, 2011, The Third International Conference on Advances in System Simulation. ThinkMind.

Haarnoja, T., Zhou, A., Abbeel, P., & Levine, S. "Soft actor-critic: Off-policy maximum entropy deep reinforcement earning with a stochastic actor" in International conference on machine learning, 2000, pp. 1861-1870. PMLR.

Ziebart, B. D., Maas, A. L., Bagnell, J. A., & Dey, A. K. "Maximum entropy inverse reinforcement learning" in Aaai, Jul. 2008, pp. 1433-1438. vol. 8.

"Soft Actor-Critic," https://spinningup.openai.com/en/latest/algorithms/sac.html, 2020, [Online; accessed Mar. 10, 2020].

Chen, Y., Dong, C., Palanisamy, P., Mudalige, P., Muelling, K., & Dolan, J. M. "Attention-based Hierarchical Deep Reinforcement Learning for Lane Change Behaviors in Autonomous Driving" in 2019 IEEE/RSJ International Conference on Intelligent Robots and Systems (IROS), Nov. 2016, pp. 3697-3703. IEEE.

Hochreiter, S., & Schmidhuber, J. "Long short-term memory" Neural computation, 9(8), 1997, pp. 1735-1780.

Dahl, G. E., Sainath, T. N., & Hinton, G. E., "Improving deep neural networks for LVCSR using rectified linear units and dropout", in 2013 IEEE international conference on acoustics, speech and signal processing, May 2013, pp. 8609-8613. IEEE.

Kahn, G., Villaflor, A., Pong, V., Abbeel, P., & Levine, S., "Uncertainty-aware reinforcement learning for collision avoidance. arXiv preprint", 2017, arXiv:1702.01182.

Bochkovskiy, A., Wang, C. Y., & Liao, H. Y. M., "YOLOv4: Optimal Speed and Accuracy of Object Detection", 2020, arXiv preprint arXiv:2004.10934.

Weng, X., & Kitani, K., "A baseline for 3d multi-object tracking", 2019, arXiv preprint arXiv:1907.03961, 1(2), 6.

Li, L., Jamieson, K., DeSalvo, G., Rostamizadeh, A., & Talwalkar, A., "Hyperband: A novel bandit-based approach to hyperparameter optimization", The Journal of Machine Learning Research, 2017, 18(1), 6765-6816.

Snider, J. M. "Automatic steering methods for autonomous automobile path tracking", Robotics Institute, Pittsburgh, PA, Feb. 2009, Tech. Rep. CMU-RITR-09-08.

Nagabandi, A., Clavera, I., Liu, S., Fearing, R. S., Abbeel, P., Levine, S., & Finn, C. "Learning to adapt in dynamic, real-world environments through meta-reinforcement learning", ICLR, 2019, arXiv preprint arXiv: 1803.11347.

Levine, S., Kumar, A., Tucker, G., & Fu, J., "Offline reinforcement learning: Tutorial, review, and perspectives on open problems", 2020, arXiv preprint arXiv:2005.01643.

Simon, M., Milz, S., Amende, K., & Groß, H., "Complex-YOLO: Real-time 3D Object Detection on Point Clouds", 2020, ArXiv, abs/1803.06199.

* cited by examiner

AUTONOMOUS DRIVING DEVICE

CROSS-REFERENCE TO RELATED APPLICATION

The present application claims priority under 35 U.S.C. § 119(a) to Korean Patent Application No. 10-2021-0157644, filed on Nov. 16, 2021, which is incorporated herein by reference in its entirety.

BACKGROUND

1. Technical Field

Various embodiments generally relate to an autonomous driving device, and more specifically, to an autonomous driving device that performs autonomous driving by employing deep reinforcement learning with spatial and temporal attention technology.

2. Related Art

Autonomous driving technology in a real road environment is being intensively studied.

In particular, autonomous driving at an intersection without a traffic light is a difficult task.

If safety is overemphasized, it causes traffic congestion.

Therefore, it is necessary to develop autonomous driving technology in consideration of efficiency as well as safety.

For example, in the conventional autonomous driving technology, Time to Collision (TTC) is used as a main indicator.

In this case, the time to collision is considered without considering sudden movement of surrounding vehicles.

If a vehicle is controlled very conservatively to avoid collisions, it may increase traffic congestion at an intersection.

As another example, when all vehicles at an intersection share their own information through the use of a communication network, a passing time of each vehicle at the intersection may be scheduled based on the shared information.

To share their own information between the vehicles, it requires an infrastructure to manage communication between the vehicles and control the vehicles. Such an infrastructure may incur disproportionate cost.

As another example, neural network technology that performs supervised learning using driving data at an intersection is also used. However, the conventional method using neural network technology has not yet become an effective alternative.

Accordingly, there is a demand for autonomous driving technology that can control a vehicle to safely drive at an intersection without compromising efficiency.

SUMMARY

In accordance with an embodiment of the present disclosure, an autonomous driving device may include an execution network configured to determine a target speed of a driving vehicle at a current time according to a state information history including a plurality of state information for road environment, the plurality of state information being generated at a plurality of times, respectively, wherein the execution network includes a spatial attention network configured to receive the state information history and to generate feature data reflecting spatial importance based on the state information history; and a temporal attention network configured to determine the target speed of the driving vehicle by applying temporal importance to an output of the spatial attention network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
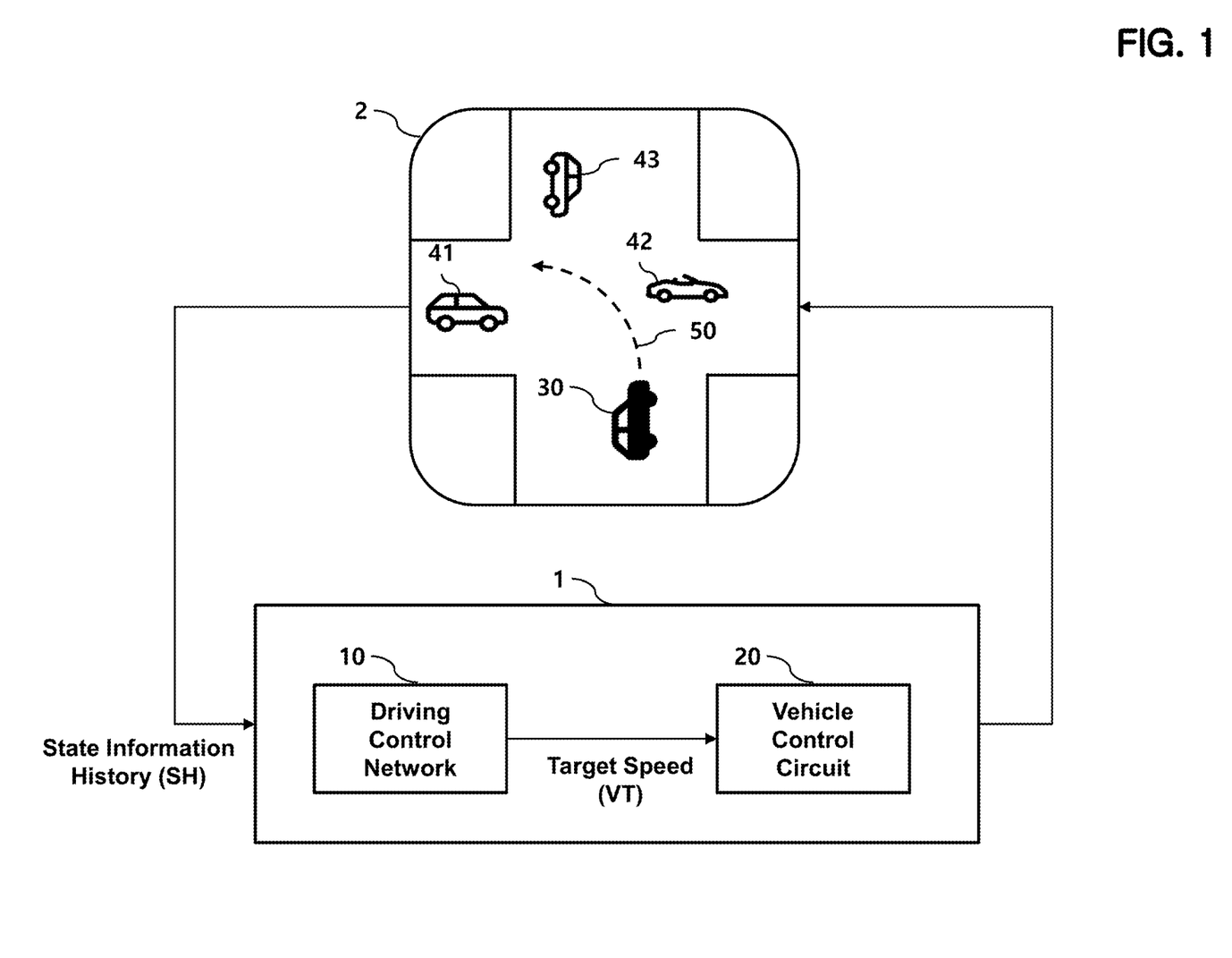
FIG. 1 illustrates an autonomous driving device according to an embodiment of the present disclosure.

FIG. 1 illustrates an autonomous driving device 1 according to an embodiment of the present disclosure.

In FIG. 1, it is assumed that the autonomous driving device 1 is mounted on a driving vehicle 30 in road environment 2.

In the present embodiment, it is assumed that the road environment 2 is an intersection environment, but is not limited thereto.

In the road environment 2, there may be a plurality of vehicles 41, 42, and 43 surrounding the driving vehicle 30. The vehicles 41, 42, and 43 may be referred to as "surrounding vehicles."

A dotted arrow 50 indicates a target driving trajectory 50 of the driving vehicle 30 at an intersection. The target driving trajectory 50 may be predetermined as a moving path of the driving vehicle 30 in the intersection.

The autonomous driving device 1 includes a driving control network 10 and a vehicle control circuit 20.

The driving control network 10 determines a target speed VT of the driving vehicle 30 by using a state information history SH provided from other devices of the driving vehicle 30 based on the road environment 2.

In an embodiment, the state information history SH includes information on surrounding vehicles in the road environment 2 perceived by sensors in the driving vehicle 30.

The state information history SH includes a series of state information S. For example, when a current time is represented with t, the state information history SH includes a plurality of state information, e.g., n state information $S_t$, $S_{t-1}, \ldots, S_{t-n+1}$ respectively generated at n times t, t–1, ..., and t–n+1, where n is a natural number greater than 1.

In this embodiment, each state information S includes location information of surrounding vehicles SS, driving vehicle state information SD, and target trajectory information ST, at a corresponding time. The location information of surrounding vehicles SS may be referred to as "surrounding vehicle location information."

In the present embodiment, the surrounding vehicle location information SS includes location data obtained by scanning locations of surrounding vehicles in a predetermined distance range from the driving vehicle 30.

Figure 2:
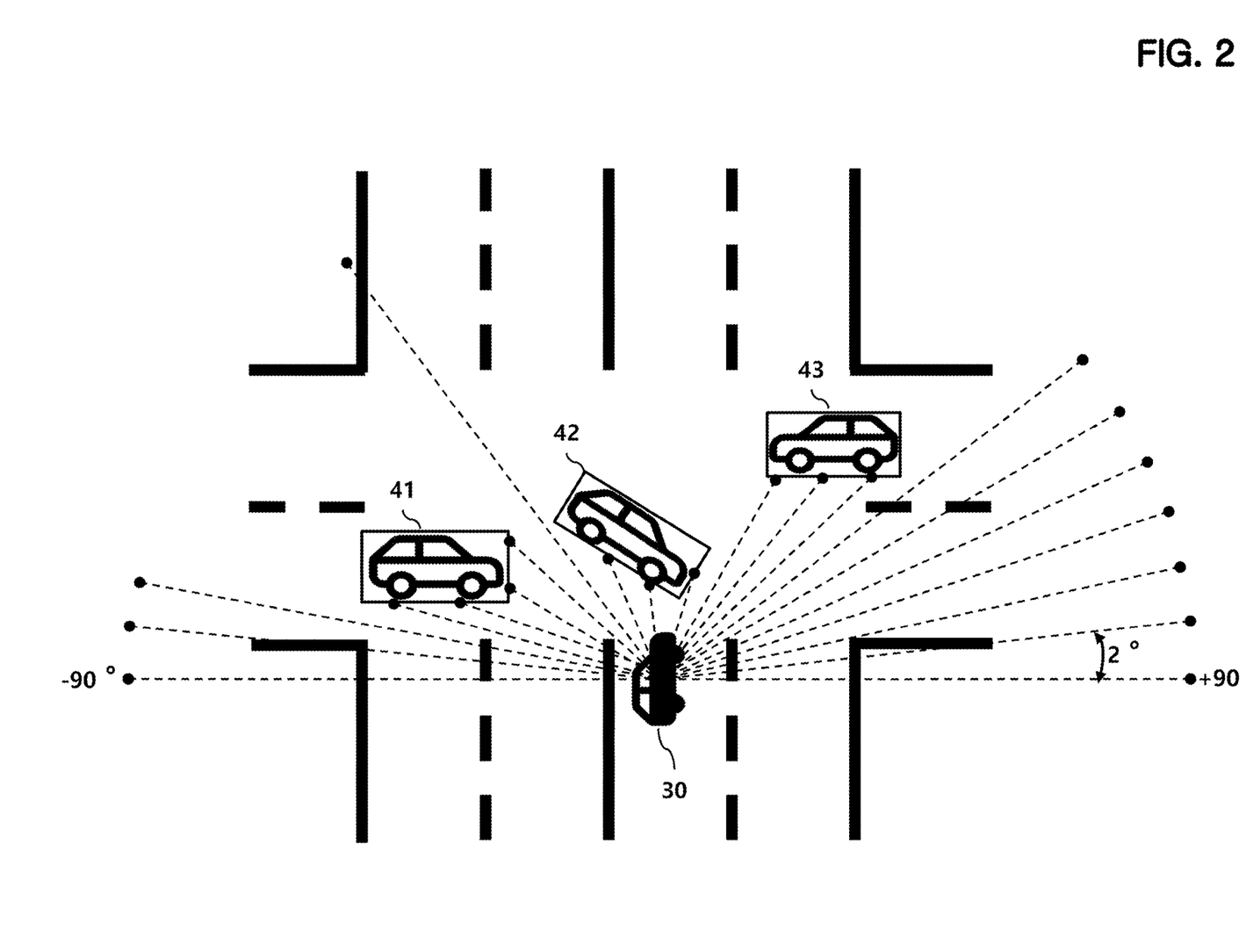
FIG. 2 illustrates location information of surrounding vehicles according to an embodiment of the present disclosure.

FIG. 2 illustrates location information of surrounding vehicles according to an embodiment of the present disclosure.

Locations of surrounding vehicles 41, 42, and 43 may be determined from a driving vehicle 30 by using a conventional technique, e.g., by using a camera or a light detection and ranging (LIDAR) sensor.

As another technique, the locations of the surrounding vehicles 41, 42, and 43 may be calculated by photographing a road at the driving vehicle 30 and applying computer vision technology to the photographed picture.

Since such techniques are prior arts, detailed description thereof will be omitted.

In the present embodiment, the surrounding vehicle location information SS is expressed as data having a scan format. The data having the scan format may be referred to as "scan format data."

The scan format data may be generated from position information including an angle and a range of each of the surrounding vehicles 41, 42, and 43. The angle and the range of each of the surrounding vehicles 41, 42, and 43 are determined based on a relative position from the driving vehicle 30.

The scan format data includes a set of range elements, each of which is determined for each angular sector of a predetermined resolution in front of the driving vehicle 30.

In this embodiment, a 180 degrees semicircle in front of the driving vehicle 30 is divided by the predetermined resolution of 2 degrees to generate 91 angular sectors, where the left side of the driving vehicle 30 corresponds to –90 degrees and the right side of the driving vehicle 30 corresponds to 90 degrees with respect to a forward driving direction of the driving vehicle 30. The left side of –90 degrees and the right side of 90 degrees constitute the 180 degrees semicircle. Accordingly, locations of the surrounding vehicles are transformed to a total of 91 range elements respectively corresponding to the 91 angular sectors, and can be expressed as follows.

$$SS = \{d_1, d_2, d_3, \ldots, d_{91}\}$$

If a surrounding vehicle is detected in a certain angular sector, a range element $d_i$ of the certain angular sector is determined as a distance between the surrounding vehicle and the driving vehicle 30, i being in a range of 1 to 91. If any surrounding vehicle is not detected in a certain angular sector, a range element of the certain angular sector may have a predetermined maximum value such as 100 meters.

Among the state information S, the driving vehicle state information SD includes information about a dynamic state of the driving vehicle 30.

In the present embodiment, the driving vehicle state information SD includes a speed $V_t$ at a corresponding time t, a steering direction D, and a target speed $VT_{t-1}$ output at a previous time t–1, and may be expressed as follows.

$$SD = \{V_t, D, VT_{t-1}\}$$

Among the state information S, the target driving trajectory information ST includes coordinate information of a predetermined number of points located on the target driving trajectory 50 of FIG. 1. The predetermined number of points represent future driving positions of the driving vehicle 30 based on a current position of the driving vehicle 30. In this embodiment, the target driving trajectory information ST includes coordinates of 15 points and it can be expressed as follows.

$$ST = \{x_1, \ldots, x_{15}, y_1, \ldots, y_{15}\}$$

As described above, it is assumed that the target driving trajectory 50 is predetermined by a driving plan of the driving vehicle 30. For example, a trajectory determined by a navigation program may be used as the target driving trajectory 50.

Referring back to FIG. 1, the driving control network 10 may include a neural network learned through reinforcement learning according to an embodiment. The driving control network 10 may be implemented as hardware, software, or a combination of hardware and software.

The vehicle control circuit 20 controls a speed of the driving vehicle 30 according to the target speed VT provided by the driving control network 10, and adjusts a steering angle of the driving vehicle 30 according to the target driving trajectory 50.

Figure 3:
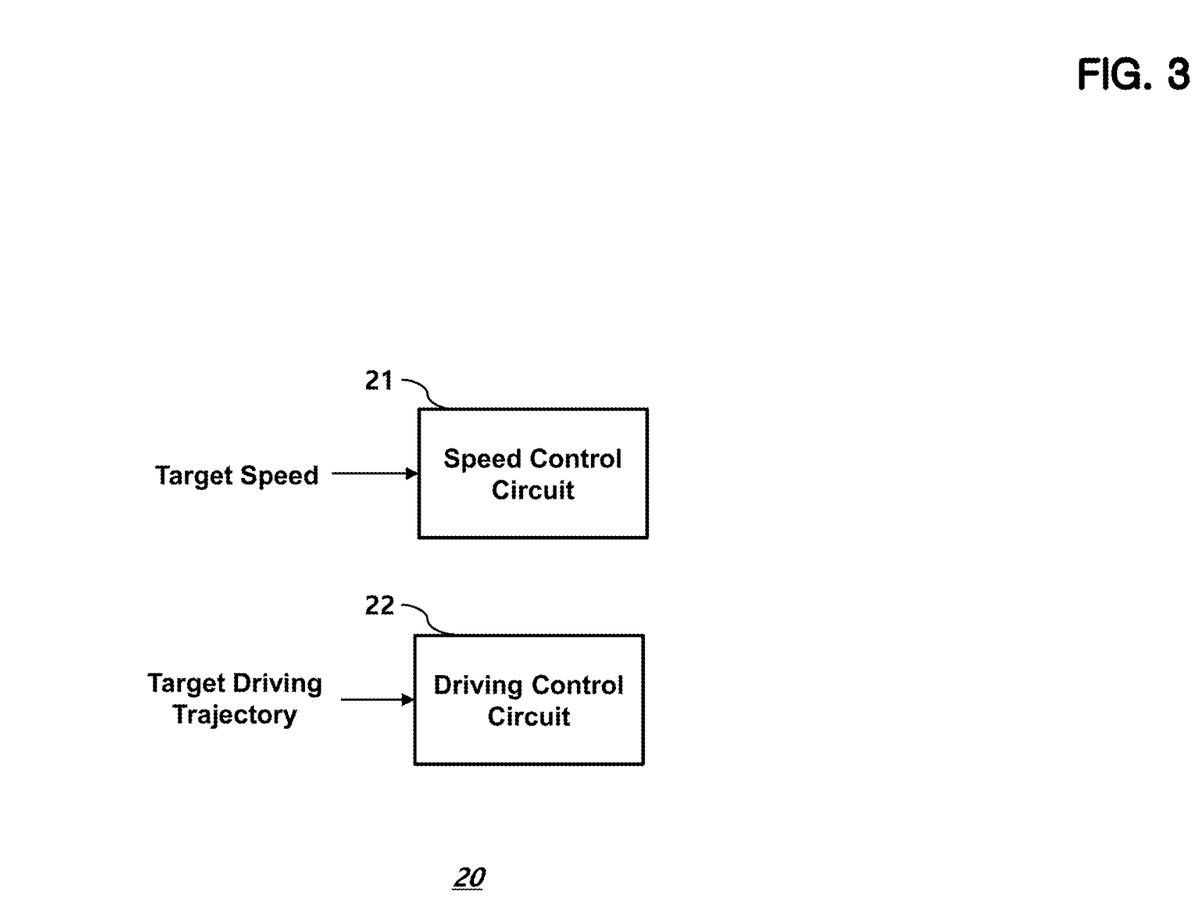
FIG. 3 illustrates a vehicle control circuit according to an embodiment of the present disclosure.

Referring to FIG. 3, the vehicle control circuit 20 includes a speed control circuit 21 for adjusting the speed of the driving vehicle 30 according to the target speed VT and a steering control circuit 22 for adjusting the steering angle according to the target driving trajectory 50.

Since the speed control circuit 21 and the steering control circuit 22 can be easily recognized by those skilled in the art from the prior art, detailed descriptions thereof will be omitted.

A state of the driving vehicle 30 controlled by the autonomous driving device 1 is reflected in the road environment 2, which causes a change in the state information S.

Figure 4:
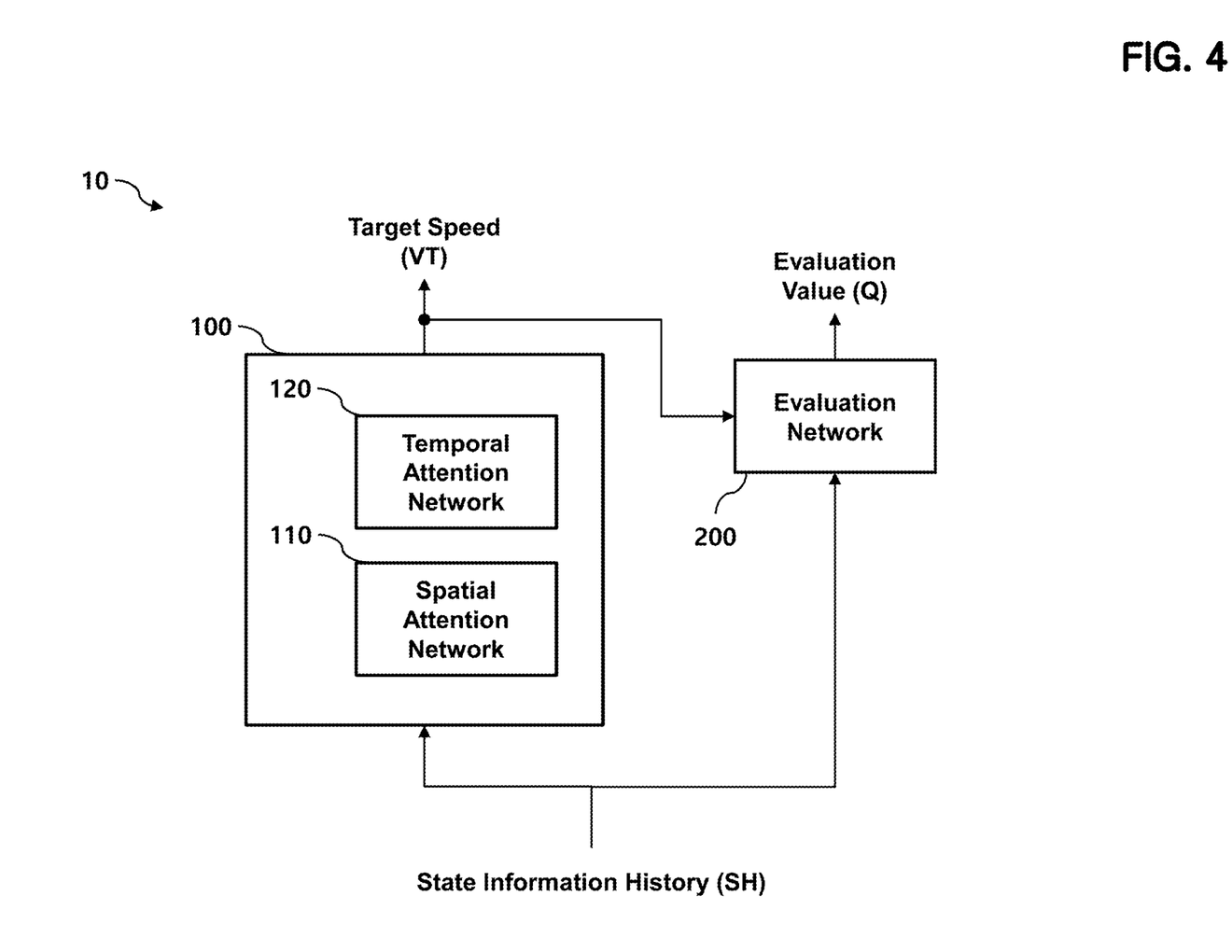
FIG. 4 illustrates a driving control network according to an embodiment of the present disclosure.

FIG. 4 illustrates a driving control network 10 according to an embodiment of the present disclosure. The driving control network 10 of FIG. 4 may correspond to the driving control network 10 of FIG. 1.

Referring to FIG. 4, the driving control network 10 includes an execution network 100 and an evaluation network 200.

The driving control network 10 performs a driving control operation using a state information history SH, and the evaluation network 200 is used for learning the execution network 100. As described above with reference to FIG. 1, the state information history SH includes a series of state information S. When a current time is represented with t, the state information history SH may include a plurality of state information $S_t, S_{t-1}, \ldots, S_{t-n+1}$ respectively corresponding to n previous times.

In the present embodiment, the execution network 100 extracts feature data in consideration of both spatial importance and temporal importance from the state information history SH. For example, the spatial importance represents how risky each angular sector is and the temporal importance represents how meaningful each state is over the state information history.

To this end, the execution network 100 includes a spatial attention network 110 and a temporal attention network 120.

The spatial attention network 110 extracts spatially important information while the driving vehicle 30 passes through the road environment 2.

The temporal attention network 120 extracts temporally important information while the driving vehicle 30 passes through the road environment 2.

In the present embodiment, the execution network 100 finally outputs a target speed VT of the driving vehicle 30 at the current time t.

The evaluation network 200 is used in a process of learning the execution network 100 through the reinforcement learning.

In the learning process, the execution network 100 generates values corresponding to an average and a standard deviation of the target speed VT according to the state information history SH, and the evaluation network 200 receives the state information history SH and a value sampled from a Gaussian distribution corresponding to the average µ and the log value σ of the standard deviation of the target speed output from the execution network 100 and generates an evaluation value Q.

In the present embodiment, a Soft Actor Critic (SAC) algorithm, which is a type of deep reinforcement learning, is used for learning the driving control network 10, and the execution network 100 and the evaluation network 200 are learned in a simulation environment.

For example, in order to adjust coefficients of a network during the learning process, the coefficients may be adjusted in a direction that minimizes an objective function corresponding to the network by using a backpropagation technique.

In case of the evaluation network 200, the objective function corresponds to a temporal difference error between an evaluation value $Q_t$ at the current time t and the evaluation value $Q_{t+1}$ at the next time t+1 and coefficients of the evaluation network 200 are adjusted to minimize the objective function, i.e., the temporal difference error.

In case of the execution network 100, the objective function is defined as a negative value of the evaluation value $Q_t$ at the current time t and its coefficients are adjusted so that the execution network 100 outputs a target speed VT that minimizes the objective function and thus maximizes the evaluation value $Q_t$.

The evaluation value $Q_t$ is determined according to a predetermined reward function in the reinforcement learning environment, and a value of the reward function may be calculated according to the state information $S_t, S_{t-1}, \ldots, S_{t-n+1}$ and a target speed at the current time t. The coefficients of the execution network 100 and the coefficients of the evaluation network 200 may be adjusted alternately.

The reward function used in this embodiment will be described later.

Since the learning operation performed according to the SAC algorithm and the operation for adjusting the coefficients by the backpropagation technique can be easily recognized by those skilled in the art from the prior art, a detailed description thereof will be omitted.

Figure 5:
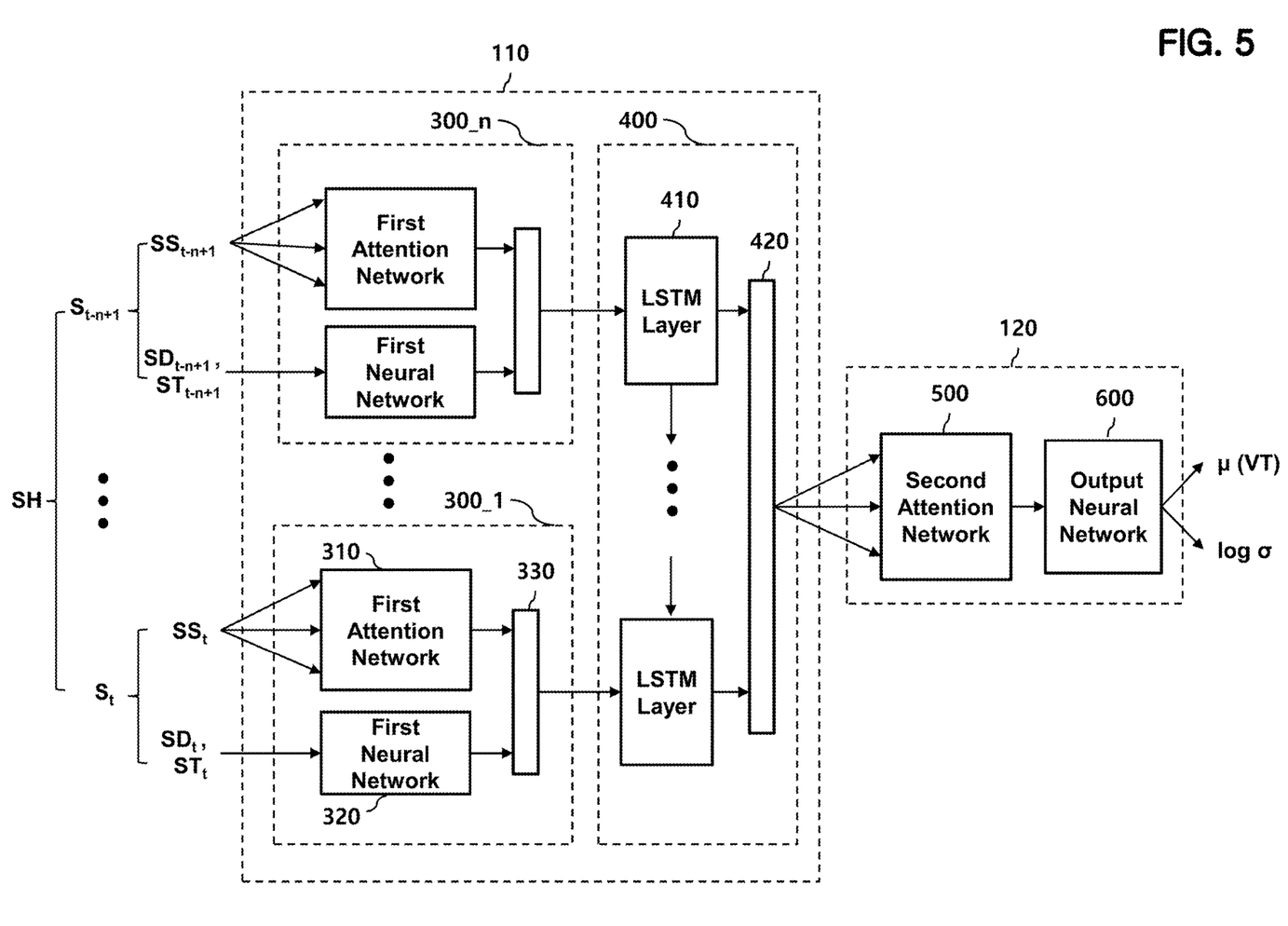
FIG. 5 illustrates an execution network according to an embodiment of the present disclosure.

FIG. 5 illustrates an execution network 100 according to an embodiment of the present disclosure. The execution network 100 of FIG. 5 may correspond to the execution network 100 of FIG. 4

Referring to FIG. 5, the execution network 100 includes a spatial attention network 110 and a temporal attention network 120.

The spatial attention network 110 includes a plurality of sub-spatial attention networks 300_1 to 300_n and a first combining network 400. The plurality of sub-spatial attention networks 300_1 to 300_n receive a plurality of state information $S_t, S_{t-1}, \ldots, S_{t-n+1}$ included in a state information history SH, and the first combining network 400 combines outputs of the plurality of sub-spatial attention networks 300_1 to 300_n.

The configurations of the plurality of sub-spatial attention networks 300_1 to 300_n are all the same. Each of the plurality of sub-spatial attention networks 300_1 to 300_n receives a corresponding one of the plurality of state information $S_t, S_{t-1}, \ldots, S_{t-n+1}$.

For example, the first sub-spatial attention network 300_1 includes a first attention network 310.

The first attention network 310 receives location information of surrounding vehicles $SS_t$ included in the state information $S_t$, and outputs feature data by reflecting a spatially noteworthy part of the location information $SS_t$ in determining a target speed VT of the driving vehicle 30 at a current time t. For example, the first attention network 310 provides more weight on the location information having more spatial importance.

The first attention network 310 is well known in the prior art and may be configured in various ways. In this embodiment, an attention network shown in FIG. 7 is used.

Figure 7:
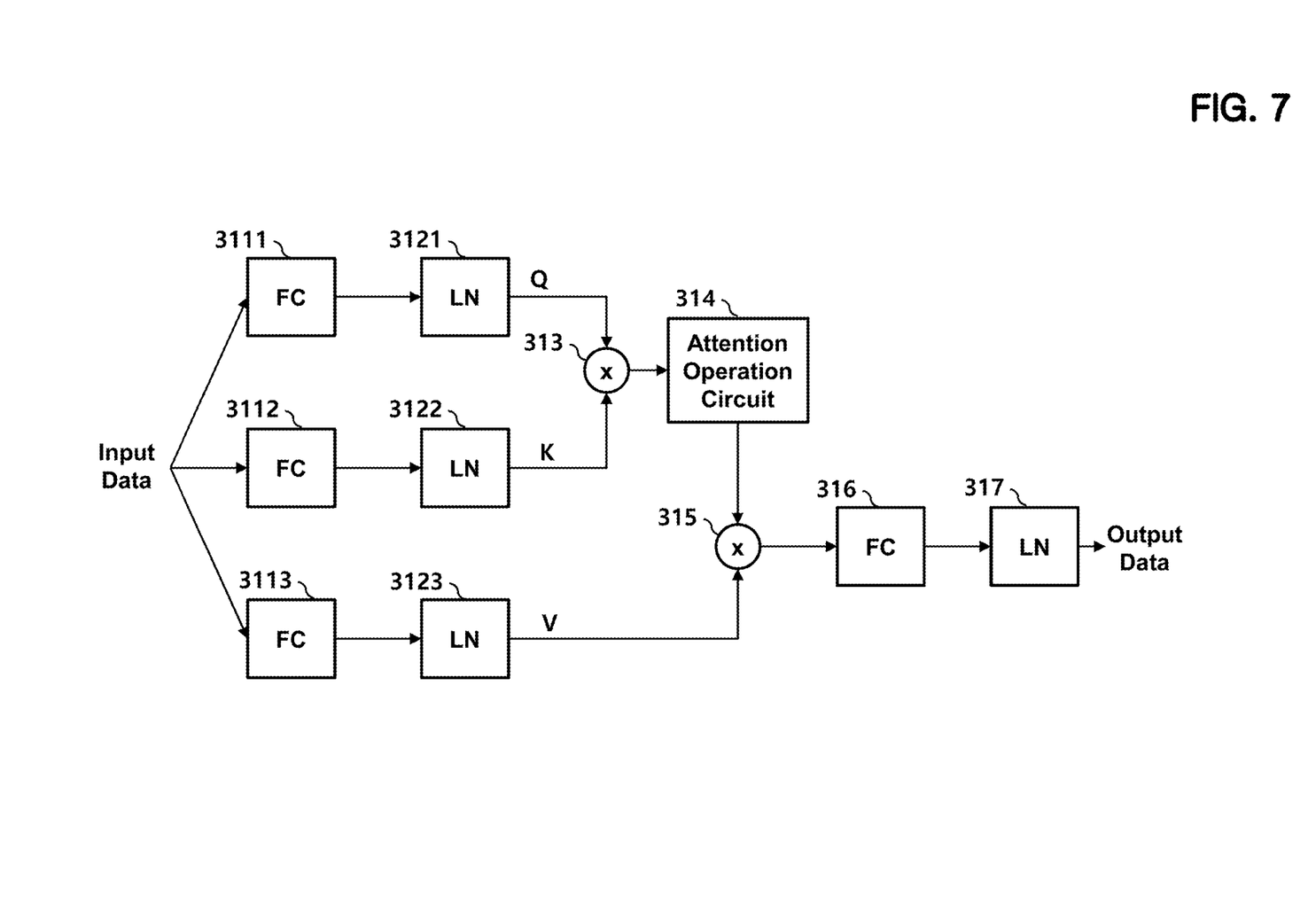
FIG. 7 illustrates a first attention network according to an embodiment of the present disclosure.

Referring to FIG. 7, the first attention network 310 generates output data by reflecting a spatially noteworthy part in input data. The input data may correspond to the location information of surrounding vehicles, and the output data may correspond to the feature data.

The input data is provided to a plurality of first fully connected neural networks (FCs) 3111, 3112, and 3113.

Data output from the plurality of first fully connected neural networks 3111, 3112, and 3113 are normalized as data Q, K, and V by a plurality of first layer normalization circuits (LNs) 3121, 3122, and 3123, respectively.

The data Q and K output from the two first layer normalization circuits 3121 and 3122 are provided to a first SoftMax operation circuit 313.

An attention operation circuit 314 performs an attention operation on an output of the SoftMax operation circuit 313 by using an attention map.

An output of the attention operation circuit 314 and the data V output from the first layer normalization circuit 3123 are provided to a second SoftMax operation circuit 315.

An output of the second SoftMax operation circuit 315 is provided to a second fully connected neural network (FC) 316.

A second layer normalization circuit 317 normalizes an output of the second fully connected neural network 316 to generate the output data, i.e., the feature data.

Returning to FIG. 5, the first sub-spatial attention network 300_1 further includes a first neural network 320.

The first neural network 320 receives the driving vehicle state information $SD_t$ and the target driving trajectory information $ST_t$ included in the state information $S_t$ and extracts feature data. In this case, the feature data may include dynamic characteristics of the driving vehicle 30 and characteristics of the target driving trajectory 50 of FIG. 1. The first neural network 320 may be implemented as a fully connected neural network including a plurality of layers.

The first sub-spatial attention network 3001 may further include a buffer 330 for storing feature data output from the first attention network 310 and feature data output from the first neural network 320.

The first combining network 400 combines feature data output from the plurality of sub-spatial attention networks 300_1 to 300_n.

In the present embodiment, the first combining network 400 is a long short-term memory (LSTM) network, which is one of the well-known neural networks in the prior art, but is not limited thereto.

The first combining network 400 includes a plurality of layers 410 that are sequentially connected to each other, and the layer 410 may be referred to as an LSTM layer in this embodiment.

Each of the plurality of LSTM layers 410 receives an output of a corresponding one of the plurality of sub-spatial attention networks 300_1 to 300_n.

As shown in FIG. 5, a higher-level LSTM layer among the plurality of LSTM layers 410 receives an output of a sub-spatial attention network corresponding to relatively more recent state information, e.g., $S_t$.

The higher-level LSTM layer 410 further receives an output of a lower-level LSTM layer, which receives an output of a sub-spatial attention network corresponding to relatively older state information, e.g., $S_{t-1}$, than the state information $S_t$. Accordingly, as it goes up to a higher-level, the LSTM layer 410 outputs feature data reflecting a greater number of past state information.

The first combining network 400 further includes a buffer 420 for storing outputs of the plurality of LSTM layers 410 in parallel.

As described above, it can be understood that the spatial attention network 110 generates a plurality of spatially important feature data using the plurality of state information $S_t$ to $S_{t-n+1}$, combines the plurality of spatially important feature data in chronological order, and outputs the combined feature data.

The temporal attention network 120 includes a second attention network 500 that processes the combined feature data output from the spatial attention network 110.

The second attention network 500 performs an attention operation in which temporal importance is assigned to the combined feature data output from the spatial attention network 110.

The configuration of the second attention network 500 is substantially the same as that shown in FIG. 7. However, specific coefficients of the neural network included therein may be different from those of the first attention network 310.

The temporal attention network 120 further includes an output neural network 600 receiving an output of the second attention network 500. The output neural network 600 may be implemented as a fully connected neural network.

The output neural network 600 generates an average $\mu$ of the target speed and a log value $\log \sigma$ of a standard deviation of the target speed.

During the learning operation, the target speed VT at the current time t is determined as a value sampled from a Gaussian distribution corresponding to the average $\mu$ and the log value $\sigma$ of the standard deviation of the target speed output from the output neural network 600.

During the learning operation, the driving control network 10 outputs the target speed VT having randomness according to a stochastic policy. Accordingly, the learning operation is performed based on more diverse driving conditions and environments.

The average $\mu$ and the log value $\sigma$ output from the output neural network 600 are also reflected in the objective function of the evaluation network 200 and may be used for the reinforcement learning.

When an inference operation is performed after the learning operation is completed, the average $\mu$ output from the output neural network 600 is used as the target speed VT. That is, in the inference operation, unlike the learning operation, a single target value, i.e., the target speed VT, is determined according to a deterministic policy.

Figure 6:
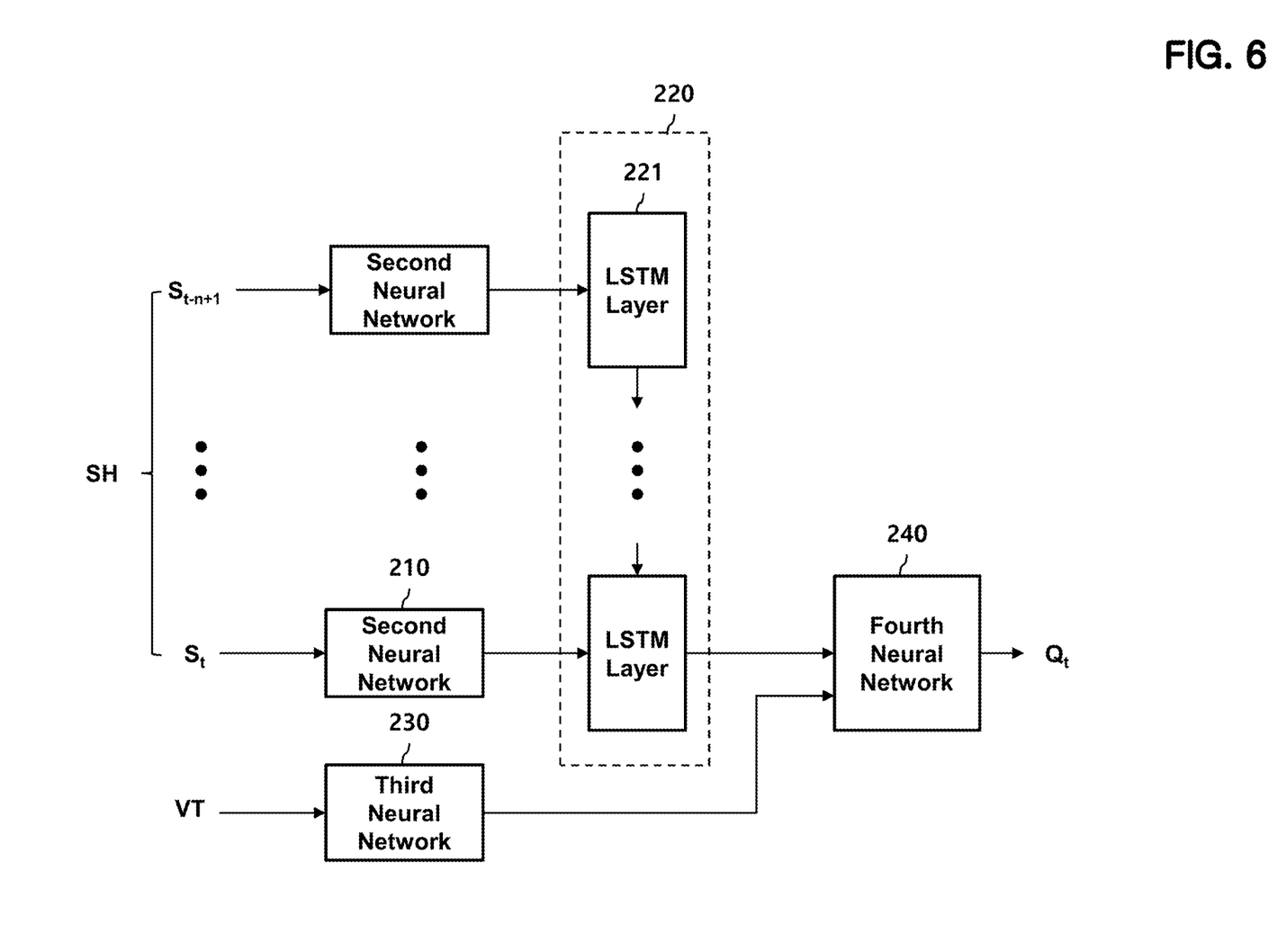
FIG. 6 illustrates an evaluation network according to an embodiment of the present disclosure.

FIG. 6 illustrates the evaluation network 200 of FIG. 4 according to an embodiment of the present disclosure.

The evaluation network 200 includes a plurality of second neural networks 210 that receive the plurality of state information $S_t$ to $S_{t-n+1}$, a second combining network 220 that combines data output from the plurality of second neural networks 210, a third neural network 230 that receives data output from the execution network 100, and a fourth neural network 240 that receives an output of the second combining network 220 and an output of the third neural network 230 and outputs an evaluation value Q.

In this embodiment, the plurality of second neural networks 210, the third neural networks 230, and the fourth neural networks 240 may each be implemented as fully connected neural networks.

The second combining network 220 includes a plurality of layers 221 and may be implemented as an LSTM neural network. A layer 221 of the second combining network 220 may be referred to as an LSTM layer.

Each of the plurality of LSTM layers 221 receives an output of a corresponding one of the plurality of second neural networks 210. In addition, among the plurality of LSTM layers 221, a higher-level LSTM layer corresponding to more recent state information receives an output of a lower-level LSTM layer corresponding to older state information than the more recent state information.

In this embodiment, the fourth neural network 240 receives an output of the final-level LSTM layer, i.e., the highest-level LSTM layer, which corresponds to the state information $S_t$ and an output of the third neural network 230, and generates the evaluation value Q.

As shown in Equation 1 below, a reward function R used in reinforcement learning may be defined with three reward terms r1, r2, and r3, which are related to a collision, an appropriate speed, and a time interval (TI), respectively, and with corresponding weights w1, w2, and w3.

The time delay will be disclosed in detail below.

$$R = w1 \times r1 + w2 \times r2 + w3 \times r3 \qquad \text{[Equation 1]}$$

The first reward term r1 is related to a collision. To prevent a collision with a nearby vehicle, a negative reward value is given to the first reward term r1 when a collision occurs.

In this case, a value of the first reward term r1 is set to be proportional to a speed at a moment of collision, so that the penalty can be set to be smaller as a collision speed decreases. Through this, it is possible to learn the execution network 100 to safely reduce a speed V of the driving vehicle 30 when a collision risk is high.

The first reward term r1 related to a collision may be given as follows.

r1 = −(0.1 + V/40), in case of collision
r1 = 0, otherwise

The second reward term r2 is related to a predetermined appropriate speed, and a higher reward value is given to the second reward term r2 when the target speed VT close to the appropriate speed, for example, 20 km/hour, is derived at an intersection. The reward term r2 may be defined as follows.

r2=0.05×VT, when the target speed VT is less than or equal to the appropriate speed r2=0.05×(40−VT), when the target speed VT exceeds the appropriate speed The third reward term r3 is related to a time interval (TI), and a negative reward value is given to the third reward term r3 by considering a TI with each surrounding vehicle with respect to the target driving trajectory 50 of the driving vehicle 30. The time interval corresponds to difference between arriving times of a surrounding vehicle and the driving vehicle (30) to an arbitrary crossing point on the target driving trajectory 50. If there is no crossing point with a surrounding vehicle, the TI between the surrounding vehicle and the driving vehicle (30) is set as a pre-defined maximum time interval value.

Since a risk of collision with a surrounding vehicle decreases as a TI gets longer, the third reward term r3 may have a negative reward value that exponentially decreases in magnitude with respect to the TI.

A formula for calculating the third reward term r3 related to the TI can be defined as follows:

$$r3=-\exp(-TI).$$

The weights w1, w2, and w3 may be defined differently according to the importance of each reward term.

For example, when high importance is given to a collision reward term, i.e., the first reward term r1, the weights w1, w2, and w3 can be defined as follows:

$$w1=100.0, w2=1.0, \text{ and } w3=1.0.$$

An autonomous driving simulator such as CARLA, an open-source simulator for autonomous driving research, can be used as a learning environment for the reinforcement learning, and a state information history generated in the simulator environment and a target speed output from a network model generated by receiving the state information history can be used for learning.

The learning environment can also be configured based on real road environment data generated by using a human driver and an aerial image of an intersection taken by a drone, and can be configured to reduce a gap between the real driving environment and the learning environment.

Since the process of learning the execution network 100 and the evaluation network 200 using the reinforcement learning can be easily understood by those skilled in the art with reference to the foregoing disclosure, a detailed description thereof will be omitted.

Although various embodiments have been illustrated and described, various changes and modifications may be made to the described embodiments without departing from the spirit and scope of the invention as defined by the following claims.

What is claimed is:

1. An autonomous driving device, comprising:
   an execution network configured to determine a target speed of a driving vehicle at a current time according to a state information history including a plurality of state information for road environment, the plurality of state information being generated at a plurality of times, respectively,
   wherein the execution network includes:
   a spatial attention network configured to receive the state information history and to generate feature data based on the state information history; and
   a temporal attention network configured to determine the target speed of the driving vehicle by applying temporal importance to an output of the spatial attention network,
   wherein each of the plurality of state information included in the state information history includes location information of surrounding vehicles, wherein the temporal attention network includes: a second attention network configured to receive an output of the spatial attention network and to provide more weight on data having more temporal importance; and an output neural network configured to generate the target speed using an output of the second attention network.

2. The autonomous driving device of claim 1, wherein the spatial attention network includes:
   a plurality of sub-spatial attention networks configured to receive the plurality of state information included in the state information history; and
   a first combining network configured to combine outputs of the plurality of sub-spatial attention networks.

3. The autonomous driving device of claim 2, wherein each of the plurality of state information further includes driving vehicle state information regarding a dynamic state of the driving vehicle, and target driving trajectory information of the driving vehicle.

4. The autonomous driving device of claim 3, wherein each of the plurality of sub-spatial attention networks includes:
   a first attention network configured to receive the location information of the surrounding vehicles and provide more weight on data having more spatial importance; and
   a first neural network configured to receive the driving vehicle state information and the target driving trajectory information.

5. The autonomous driving device of claim 2, wherein the first combining network includes a plurality of layers that are sequentially connected to each other, wherein each of the plurality of layers receives an output of a corresponding one of the plurality of sub-spatial attention networks, and wherein feature data output from the plurality of layers are provided to the temporal attention network.

6. The autonomous driving device of claim 5, wherein the plurality of layers include a lower-level layer and a higher-level layer, the higher-level layer receiving an output from the lower-level layer,
   wherein, among the plurality of state information, first state information provided to a sub-attention network connected to the lower-level layer is generated prior to second state information provided to a sub-attention network connected to the higher-level layer.

7. The autonomous driving device of claim 1, further comprising an evaluation network configured to generate an evaluation value by using the state information history and an output of the execution network during a learning operation.

8. The autonomous driving device of claim 7, wherein the evaluation network includes:
   a plurality of second neural networks receiving the plurality of state information;
   a third neural network receiving the output of the execution network;

a second combining network configured to combine outputs of the plurality of second neural networks; and a fourth neural network configured to receive an output of the second combining network and an output of the third neural network to generate the evaluation value.

9. The autonomous driving device of claim 8, wherein the second combining network includes a plurality of layers sequentially connected to each other, each of the plurality of layers receives an output of a corresponding one of the plurality of second neural networks, and an output of the second combining network corresponds to an output of a final one of the plurality of layers, the final layer corresponding to state information at the most recent time among the plurality of previous times.

10. The autonomous driving device of claim 9, wherein the plurality of layers include a lower-level layer and a higher-level layer, the higher-level layer receiving an output from the lower-level layer, wherein, among the plurality of state information, first state information provided to a second neural network connected to the lower-level layer is generated prior to second state information provided to a second neural network connected to the higher-level layer.

11. The autonomous driving device of claim 7, wherein, during the learning operation, the execution network generates an average and a standard deviation of target speed provides a value sampled from a Gaussian distribution corresponding to the average and the standard deviation of the target speed to the evaluation network.

* * * * *